US008445845B2

(12) United States Patent
Green et al.

(10) Patent No.: US 8,445,845 B2
(45) Date of Patent: May 21, 2013

(54) ION POPULATION CONTROL DEVICE FOR A MASS SPECTROMETER

(75) Inventors: Martin Raymond Green, Cheshire (GB); Daniel James Kenny, Knutsford (GB); Jason Lee Wildgoose, Stockport (GB)

(73) Assignee: Micromass UK Limited, Manchester (GB)

( * ) Notice: Subject to any disclaimer, the term of this patent is extended or adjusted under 35 U.S.C. 154(b) by 0 days.

(21) Appl. No.: 13/145,368

(22) PCT Filed: Jan. 20, 2010

(86) PCT No.: PCT/GB2010/000082
§ 371 (c)(1),
(2), (4) Date: Oct. 5, 2011

(87) PCT Pub. No.: WO2010/084310
PCT Pub. Date: Jul. 29, 2010

(65) Prior Publication Data

US 2012/0119078 A1 May 17, 2012

Related U.S. Application Data

(60) Provisional application No. 61/156,127, filed on Feb. 27, 2009.

(30) Foreign Application Priority Data

Jan. 20, 2009 (GB) .................................. 0900917.6

(51) Int. Cl.
*H01J 49/42* (2006.01)
*H01J 49/00* (2006.01)
*B01D 59/44* (2006.01)

(52) U.S. Cl.
USPC ........... 250/292; 250/281; 250/282; 250/283; 250/288

(58) Field of Classification Search
USPC .......................... 250/281, 282, 283, 288, 292
See application file for complete search history.

(56) References Cited

U.S. PATENT DOCUMENTS 5,572,022 A 11/1996 Schwartz et al.
6,627,876 B2 9/2003 Hager
6,987,261 B2 1/2006 Horning et al.
7,189,967 B1 3/2007 Whitehouse et al.
7,405,401 B2 * 7/2008 Hoyes ........................... 250/292
8,003,934 B2 * 8/2011 Hieke ........................... 250/288

(Continued)

FOREIGN PATENT DOCUMENTS

EP 1826809 8/2008
WO 0209144 1/2002

(Continued)

*Primary Examiner* — Nikita Wells
(74) *Attorney, Agent, or Firm* — Diederiks & Whitelaw, PLC

(57) ABSTRACT

A mass spectrometer is disclosed wherein an ion beam attenuator is arranged upstream of an ion trap mass analyser. An ion tunnel ion trap comprising an upstream ion accumulation section and a downstream ion accumulation section is arranged upstream of the ion beam attenuator. Ions are released from the ion tunnel ion trap and the intensity of the ion beam which is transmitted to the ion trap analyser is controlled by the ion beam attenuator. The fill time during which ions are admitted into the ion trap mass analyser remains substantially constant and is substantially independent of the intensity of the ion beam.

18 Claims, 10 Drawing Sheets

U.S. PATENT DOCUMENTS

| | | | | |
|---|---|---|---|---|
| 8,212,208 | B2 * | 7/2012 | Green et al. | 250/283 |
| 2003/0122071 | A1 | 7/2003 | Plomley et al. | |
| 2004/0021070 | A1 | 2/2004 | Bateman et al. | |
| 2005/0098720 | A1 | 5/2005 | Traynor et al. | |
| 2010/0084549 | A1 | 4/2010 | Ermakov et al. | |

FOREIGN PATENT DOCUMENTS

| | | |
|---|---|---|
| WO | 2006014284 | 2/2006 |
| WO | 2009007739 | 1/2009 |
| WO | 2009079222 | 6/2009 |

* cited by examiner

ION POPULATION CONTROL DEVICE FOR A MASS SPECTROMETER

CROSS-REFERENCE TO RELATED APPLICATIONS

This application is the National Stage of International Application No. PCT/GB2010/000082, filed Jan. 20, 2010, which claims priority to and benefit of U.S. Provisional Patent Application Ser. No. 61/156,127, filed on Feb. 27, 2009 and priority to and benefit of United Kingdom Patent Application No. 0900917.6, filed Jan. 20, 2009. The entire contents of these applications are incorporated herein by reference.

The present invention relates to a method of mass spectrometry and a mass spectrometer. According to a preferred embodiment a method of controlling the ion population which is transmitted to an ion trap mass analyser is provided.

Conventional ion traps and ion trap mass analysers can only contain a finite number of ions due to the electrostatic repulsion effects between ions of the same polarity. This effect is commonly referred to as space charge. If the capacity of an ion trap mass analyser is exceeded then any excess ions subsequently entering the ion trap mass analyser will be lost to the system. Furthermore, it is well known that space charge effects will degrade the performance of an ion trap mass analyser such as a 3D or Paul ion trap, a 2D or linear ion trap, a FTICR mass analyser or an Orbitrap® mass analyser and other types of mass analysers.

It is known to attempt to avoid overfilling an ion trap in order to avoid adverse space charge effects.

U.S. Pat. No. 5,572,022 (Schwartz) discloses a method wherein a group of ions are trapped and are then detected in order to determine the total ion content. The total ion content is then compared with an ideal ion content and an appropriate fill time is calculated. Ions are subsequently transferred into the mass spectrometer during the fill time in an attempt to avoid space charge effects within the mass spectrometer. The fill time varies dependent upon the determined ion current.

U.S. Pat. No. 6,627,876 (Hagar) discloses a method of setting a fill time for a mass spectrometer comprising a linear ion trap by first operating the mass spectrometer in a transmission mode of operation and detecting ions to determine an incoming ion current. A fill time for the linear ion trap is then determined by comparing the ion current with a desired charge density. The mass spectrometer is then operated in a trapping mode using the calculated fill time.

U.S. Pat. No. 6,987,261 (Horning) discloses a method wherein ions are accumulated and then detected to determine an injection or fill time appropriate for obtaining a predetermined population of ions. Ions are then accumulated for this time period and are introduced into the mass analyser.

In summary, it is known to measure an ion beam current and then to calculate a time period during which time period ions are accumulated within an ion trap with the intention of ensuring that a predetermined number of ions are accumulated within the ion trap. However, the conventional approach has a number of distinct disadvantages.

Firstly, the cycle time for a given experiment will change dependent upon the ion current. For example, when a mass spectrometer is used in conjunction with a liquid chromatography system then a wide range of ion currents may be presented to the ion trap. When a relatively large ion current is presented to the ion trap, then the fill time will be set to be relatively short and conversely when a relatively small ion current is presented to the ion trap then the fill time will be set to be relatively long. The resulting variation in cycle time can lead to uncertainty as to the number of measurements that may be obtained across a chromatographic peak.

A second disadvantage is that even for supposedly constant ion currents there will, in practice, be natural statistical fluctuations in the instantaneous ion current. Other sources of fluctuation also exist such as spray stability when using an Electrospray ionisation ion source. If the ion trap were to be filled during a period of time when the ion current was temporarily low, then fewer than the ideal number of ions will subsequently be accumulated in the ion trap which will result in a reduction in sensitivity. Conversely, if the ion trap is filled during a period of time when the ion current is temporarily high, then an excessive number ions will be accumulated in the ion trap which will lead to space charge problems.

A third disadvantage of the conventional approach is that if an ion trap mass analyser is filled with ions for varying periods of time then the ion trap mass analyser may suffer from mass to charge ratio discrimination effects. For example, when an ion trap mass analyser is filled with ions for only a relatively short period of time, then the time of flight of ions released from an ion trap upstream of the mass analyser will have an effect upon the mass to charge ratios of the ions which are accumulated within the ion trap mass analyser. As a result, different trapping efficiencies for ions having different mass to charge ratios may be observed dependent upon the fill time of the ion trap mass analyser.

It is therefore desired to provide an improved method of controlling the accumulation of ions into an ion trap mass analyser or other device.

According to an aspect of the present invention there is provided a method of mass spectrometry comprising:

providing an attenuation device and an ion trap arranged downstream of the attenuation device;

determining a first ion current $I_1$;

controlling the attenuation device based upon the determined first ion current $I_1$ so as to set the intensity of ions transmitted by the attenuation device and passed to the ion trap at a first level; and allowing ions to accumulate within the ion trap for a first fixed period of time $T_1$ which is substantially independent of the determined first ion current $I_1$.

The ion trap preferably comprises an ion trap mass analyser and an ion detector is preferably arranged to detect ions which are ejected or which otherwise emerge from the ion trap.

According to another embodiment the method may further comprise ejecting ions from the ion trap or allowing ions to emerge from the ion trap, wherein the ions are then transmitted to a mass analyser arranged downstream of the ion trap.

The step of determining the first ion current $I_1$ preferably comprises using a first device to determine the first ion current $I_1$, wherein the first device is preferably selected from the group consisting of: (i) a mass analyser; (ii) a charge detector; (iii) a charge induction device; (iv) an image current detector; and (v) an ultra-violet ("UV") detector in combination with a liquid chromatography system which is arranged and adapted to determine an absorption profile of one or more eluents.

The step of determining the first ion current $I_1$ may comprise either: (i) using previously acquired data or mass spectral data; and/or (ii) estimating the ion current based upon previously acquired data or mass spectral data.

The method preferably further comprises calculating an attenuation factor based upon the determined first ion current $I_1$, wherein the step of controlling the attenuation device preferably comprises setting the attenuation device to attenuate an ion beam which is onwardly transmitted by the attenuation device by the attenuation factor.

The attenuation device preferably comprises either: (i) an electrostatic lens which is arranged and adapted to alter, deflect, focus, defocus, attenuate, block, expand, contract, divert or reflect an ion beam; and/or (ii) one or more electrodes, rod sets or ion-optical devices which are arranged and adapted to alter, deflect, focus, defocus, attenuate, block, expand, contract, divert or reflect an ion beam.

The step of controlling the attenuation device preferably comprises repeatedly switching the attenuation device between a low transmission mode of operation and a high transmission mode of operation, wherein the attenuation device is maintained in the low transmission mode of operation for a time period $\Delta T1$ and the attenuation device is Maintained in the high transmission mode of operation for a time period $\Delta T2$ and wherein the duty cycle of the attenuation device is given by $\Delta T2/(\Delta T1+\Delta T2)$.

The method preferably further comprises:

determining a second ion current $I_2$;

controlling the attenuation device based upon the determined second ion current $I_2$ so as to set the intensity of ions transmitted by the attenuation device and passed to the ion trap at a second different level (to that of the first level); and allowing ions to accumulate within the ion trap for a second fixed period of time $T_2$ which is substantially independent of the determined second ion current $I_2$, and wherein either $T_1$ equals or substantially equals $T_2$.

The method preferably further comprises:

determining a third ion current $I_3$;

controlling the attenuation device based upon the determined third ion current $I_3$ so as to set the intensity of ions transmitted by the attenuation device and passed to the ion trap at a third different level (to that of the first and second levels); and allowing ions to accumulate within the ion trap for a third fixed period of time $T_3$ which is substantially independent of the determined third ion current $I_3$, and wherein $T_1$ equals or substantially equals $T_2$, and wherein $T_2$ equals or substantially equals $T_3$.

The method preferably further comprises:

determining a fourth ion current $I_4$;

controlling the attenuation device based upon the determined fourth ion current $I_3$ so as to set the intensity of ions transmitted by the attenuation device and passed to the ion trap at a fourth different level (to that of the first, second and third levels); and allowing ions to accumulate within the ion trap for a fourth fixed period of time $T_4$ which is substantially independent of the determined fourth ion current $I_4$, and wherein $T_1$ equals or substantially equals $T_2$, $T_2$ equals or substantially equals $T_3$, and wherein $T_3$ equals or substantially equals $T_4$.

The method preferably further comprises arranging an ion accumulation device or ion trap either upstream and/or downstream of the attenuation device.

The ion accumulation device or ion trap is preferably selected from the group consisting of: (i) an ion tunnel or ion funnel ion trap comprising a plurality of electrodes each having at least one aperture through which ions are transmitted in use; (ii) a multipole rod set; (iii) an axially segmented multipole rod set; or (iv) a plurality of plate electrodes arranged generally in a plane of ion travel.

The ion accumulation device or ion trap preferably comprises a first upstream ion accumulation region and a second downstream ion accumulation region and wherein in a mode of operation: (i) a DC or RF potential barrier is applied to an electrode arranged at the entrance to the first upstream ion accumulation region in order to prevent further ions from entering the ion accumulation device or ion trap; and/or (ii) a DC or RF potential barrier is applied to an electrode arranged between the first upstream ion accumulation region and the second downstream ion accumulation region in order to prevent ions from passing from the first upstream ion accumulation region to the second downstream ion accumulation region; and/or (iii) a DC or RF potential barrier is applied to an electrode at the exit to the second downstream ion accumulation region in order to prevent ions from exiting the ion accumulation device or ion trap.

Once ions have been accumulated in the ion accumulation device or ion trap then the ion accumulation device or ion trap may according to an embodiment be operated so as to mass selectively or mass to charge ratio selectively remove or attenuate at least some ions having an undesired mass or mass to charge ratio.

According to an embodiment ions may be ejected or may be onwardly transmitted from the ion accumulation device or ion trap in a mass selective or mass to charge ratio selective manner.

According to an aspect of the present invention there is provided a mass spectrometer comprising:

an attenuation device;

an ion trap arranged downstream of the attenuation device; and a control system arranged and adapted:

(i) to determine a first ion current $I_1$;

(ii) to control the attenuation device based upon the determined first ion current $I_1$ so as to set the intensity of ions transmitted by the attenuation device and passed to the ion trap at a first level; and (iii) to allow ions to accumulate within the ion trap for a first fixed period of time $T_1$ which is substantially independent of the determined first ion current $I_1$.

The ion trap preferably comprises an ion trap mass analyser and an ion detector arranged to detect ions which are ejected or which otherwise emerge from the ion trap.

The mass spectrometer may according to another embodiment further comprise a mass analyser arranged downstream of the ion trap, wherein, in use, ions are ejected from the ion trap or are allowed to emerge from the ion trap and are then transmitted to the mass analyser.

The mass spectrometer preferably further comprises a first device arranged and adapted to determine an ion current within the mass spectrometer.

The first device is preferably selected from the group comprising: (i) a mass analyser; (ii) a charge detector; (iii) a charge induction device; (iv) an image current detector; and (v) an ultra-violet ("UV") detector in combination with a liquid chromatography system which is arranged and adapted to determine an absorption profile of one or more eluents.

The attenuation device preferably comprises either: (i) an electrostatic lens which is arranged and adapted to alter, deflect, focus, defocus, attenuate, block, expand, contract, divert or reflect an ion beam; and/or (ii) one or more electrodes, rod sets or ion-optical devices which are arranged and adapted to alter, deflect, focus, defocus, attenuate, block, expand, contract, divert or reflect an ion beam.

The attenuation device is preferably repeatedly switched between a low transmission mode of operation and a high transmission mode of operation, wherein the attenuation device is maintained in the low transmission mode of operation for a time period $\Delta T1$ and the attenuation device is maintained in the high transmission mode of operation for a time period $\Delta T2$ and wherein the duty cycle of the attenuation device is given by $\Delta T2/(\Delta T1+\Delta T2)$.

In the low transmission mode of operation the transmission of the ion beam is preferably 0%. In the high transmission mode of operation the transmission of the ion beam is preferably 100%. The average ion beam intensity of an ion beam exiting the ion beam attenuator is preferably less than the average ion beam intensity of the ion beam incident upon the ion beam attenuator.

It is contemplated that sometimes it may be determined that based upon the determined first ion current the second ion current $I_2$, the third ion current $I_3$ or the fourth ion current $I_4$ that the ion beam does not need attenuating in which case the ions are transmitted by the ion beam attenuator without substantially attenuating the ion beam.

According to an embodiment the mass spectrometer further comprises an ion accumulation device or ion trap arranged either upstream and/or downstream of the attenuation device.

According to an embodiment the ion accumulation device or ion trap is selected from the group consisting of: (i) an ion tunnel or ion funnel ion trap comprising a plurality of electrodes each having at least one aperture through which ions are transmitted in use; (ii) a multipole rod set; (iii) an axially segmented multipole rod set; or (iv) a plurality of plate electrodes arranged generally in a plane of ion travel.

The ion accumulation device or ion trap preferably comprises a first upstream ion accumulation region and a second downstream ion accumulation region and wherein in a mode of operation: (i) a DC or RF potential barrier is applied to an electrode arranged at the entrance to the first upstream ion accumulation region in order to prevent further ions from entering the ion accumulation device or ion trap; and/or (ii) a DC or RF potential barrier is applied to an electrode arranged between the first upstream ion accumulation region and the second downstream ion accumulation region in order to prevent ions from passing from the first upstream ion accumulation region to the second downstream ion accumulation region; and/or (iii) a DC or RF potential barrier is applied to an electrode at the exit to the second downstream ion accumulation region in order to prevent ions from exiting the ion accumulation device or ion trap.

Once ions have been accumulated in the ion accumulation device or ion trap then the ion accumulation device or ion trap may be operated in a mode of operation so as to mass selectively or mass to charge ratio selectively remove or attenuate at least some ions having an undesired mass or mass to charge ratio.

In a mode of operation ions may be ejected or may be onwardly transmitted from the ion accumulation device or ion trap in a mass selective or mass to charge ratio selective manner.

According to an aspect of the present invention there is provided a computer program executable by the control system of a mass spectrometer comprising an attenuation device and an ion trap arranged downstream of the attenuation device, the computer program being arranged to cause the control system:

(i) to determine a first ion current $I_1$;

(ii) to control the attenuation device based upon the determined first ion current $I_1$ so as to set the intensity of ions transmitted by the attenuation device and passed to the ion trap at a first level; and (iii) to allow ions to accumulate within the ion trap for a first fixed period of time $T_1$ which is substantially independent of the determined first ion current $I_1$.

According to an aspect of the present invention there is provided a computer readable medium comprising computer executable instructions stored on the computer readable medium, the instructions being arranged to be executable by a control system of a mass spectrometer comprising an attenuation device and an ion trap arranged downstream of the attenuation device, the computer program being arranged to cause the control system:

(i) to determine a first ion current $I_1$;

(ii) to control the attenuation device based upon the determined first ion current $I_1$ so as to set the intensity of ions transmitted by the attenuation device and passed to the ion trap at a first level; and (iii) to allow ions to accumulate within the ion trap for a first fixed period of time $T_1$ which is substantially independent of the determined first ion current $I_1$.

The computer readable medium is preferably selected from the group consisting of: (i) a ROM; (ii) an EAROM; (iii) an EPROM; (iv) an EEPROM; (v) a flash memory; (vi) an optical disk; (vii) a RAM; and (viii) a hard disk drive.

According to an aspect of the present invention there is provided a method of mass spectrometry comprising:

determining an ion current;

attenuating an ion beam by a variable amount dependent upon the determined ion current; and allowing an attenuated ion beam to pass to an ion trap so that ions accumulate within the ion trap for a period of time which is substantially independent of the determined ion current.

According to an aspect of the present invention there is provided a mass spectrometer comprising:

a device for determining an ion current;

a device for attenuating an ion beam by a variable amount dependent upon the determined ion current; and an ion trap, wherein, in use, an attenuated ion beam is allowed to pass to the ion trap so that ions accumulate within the ion trap for a period of time which is substantially independent of the determined ion current.

According to an aspect of the present invention there is provided a method of accumulating ions in an ion trap comprising:

varying an attenuation factor by which a beam of ions is attenuated prior to being received within an ion trap, wherein the attenuation factor is dependent upon a determined ion current and wherein a fill time of the ion trap is kept substantially constant and independent of the determined ion current.

According to an aspect of the present invention there is provided a mass spectrometer comprising:

an ion trap in which ions are accumulated in use; and a control system arranged to vary the attenuation factor by which a beam of ions is attenuated prior to being received within the ion trap, wherein the attenuation factor is dependent upon a determined ion current and wherein a fill time of the ion trap is kept substantially constant and independent of the determined ion current.

According to an aspect of the present invention there is provided a method of accumulating ions comprising:

varying an attenuation factor by which a beam of ions is attenuated prior to being received within an ion trap or mass analyser, wherein the attenuation factor is dependent upon a determined ion current.

The ion trap or mass analyser is preferably selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or Orbitrap® mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

According to an aspect of the present invention there is provided a mass spectrometer comprising:

an ion trap or mass analyser; and a control system arranged to vary the attenuation factor by which a beam of ions is attenuated prior to being received by the ion trap or mass analyser, wherein the attenuation factor is dependent upon a determined ion current.

The ion trap or mass analyser is selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or Orbitrap® mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

According to a preferred embodiment of the present invention there is provided a mass spectrometer comprising an attenuation device. The attenuation device is preferably arranged to attenuate an incident ion beam such that a predetermined number of ions are accumulated in an ion trap, ion trap mass analyser or other mass analyser which is preferably arranged downstream of the attenuation device. Ions are preferably allowed to accumulate for a pre-determined or substantially constant period of time within the ion trap, ion trap mass analyser or other mass analyser. The fill time of the ion trap, ion trap mass analyser or other mass analyser is preferably invariant in relation to the determined ion beam current. This is in contrast to conventional mass spectrometers wherein the fill time of an ion trap mass analyser is varied dependent upon the determined ion beam current.

According to the preferred embodiment the ion current is determined and an attenuation factor is preferably calculated by which the incoming ion beam is to be attenuated so that a predetermined ion population is preferably accumulated within an ion trap or ion trap mass analyser. In contrast to conventional techniques, ions are preferably accumulated for a substantially fixed predetermined time period within the ion trap mass analyser. The fill time of the ion trap mass analyser is substantially invariant and is preferably not dependent upon the determined intensity of the ion beam.

Ion beam attenuation may be effected by various different means. For example, according to the preferred embodiment an electrostatic device comprising one or more electrodes may be used to alter, deflect, focus, defocus, attenuate or substantially block an ion beam.

An important advantage of the preferred embodiment is that the mass spectrometer and ion trap mass analyser are preferably operated with a substantially fixed cycle time. For a given experiment the cycle time preferably does not vary. This advantageously enables a known number of data points to be acquired over a chromatographic peak.

Another advantage of the preferred embodiment is that ions are preferably subjected to averaged ion storage. According to the preferred embodiment the ion beam is preferably sampled substantially continuously rather than for a relatively short period of time. As a result, any fluctuations in the incoming ion current will be averaged out.

A further advantage of the preferred embodiment is that ions are preferably accumulated upstream of the ion trap or ion trap mass analyser in a further ion trap. The further ion trap preferably comprises an ion tunnel ion trap. This enables ions to be stored in the further ion trap whilst ions are being mass analysed or ejected from the downstream analytical ion trap or ion trap mass analyser. Conventionally, releasing ions which have been accumulated in an ion trap for a calculated fill time of a downstream ion trap mass analyser can result in an incorrect number of ions being admitted into the analytical ion trap mass analyser due primarily to an initial surge of ions being released from the upstream ion trap rather than a steady uniform current.

Another advantage of the preferred embodiment is that by attenuating the ion beam in a manner according to the preferred embodiment the mass spectrometer is not affected by temporal variations in the ion current. The preferred embodiment may therefore be used to combine ion accumulation with ion population control in a manner which also helps minimise the time required to fill an ion trap, ion trap mass analyser or other mass analyser with a predetermined number of ions.

A further ion trap is preferably arranged upstream of the ion trap, ion trap mass analyser or other mass analyser and preferably comprises an ion tunnel ion trap. The ion tunnel ion trap preferably comprises a plurality of electrodes each preferably having at least one aperture through which ions are preferably transmitted in use.

According to an embodiment the mass spectrometer may further comprise a transient DC voltage device arranged and adapted to apply one or more transient DC voltages or potentials or one or more transient DC voltage or potential waveforms to at least some of the plurality of electrodes forming the ion tunnel ion trap. The transient DC voltage device preferably urges, forces, drives or propels at least some ions along at least 5%, 10%, 15%, 20%, 25%, 30%, 35%, 40%, 45%, 50%, 55%, 60%, 65%, 70%, 75%, 80%, 85%, 90%, 95% or 100% of the length of the ion tunnel ion trap.

The ion tunnel ion trap preferably comprises an entrance region, a central region and an exit region wherein the entrance region and/or the central region and/or the exit region is preferably maintained in use at a pressure selected from the group consisting of: (i) >100 mbar; (ii) >10 mbar; (iii) >1 mbar; (iv) >0.1 mbar; (v) $>10^{-2}$ mbar; (vi) $>10^{-3}$ mbar; (vii) $>10^{-4}$ mbar; (viii) $>10^{-5}$ mbar; (ix) $>10^{-6}$ mbar; (x) <100 mbar; (xi) <10 mbar; (xii) <1 mbar; (xiii) <0.1 mbar; (xiv) $<10^{-2}$ mbar; (xv) $<10^{-3}$ mbar; (xvi) $<10^{-4}$ mbar; (xvii) $<10^{-5}$ mbar; (xviii) $<10^{-6}$ mbar; (xix) 10-100 mbar; (xx) 1-10 mbar; (xxi) 0.1-1 mbar; (xxii) $10^{-2}$ to $10^{-1}$ mbar; (xxiii) $10^{-3}$ to $10^{-2}$ mbar; (xxiv) $10^{-4}$ to $10^{-3}$ mbar; and (xxv) $10^{-5}$ to $10^{-4}$ mbar.

According to an embodiment the further ion trap or ion accumulation device preferably comprises either: (i) an ion tunnel or ion funnel ion guide; (ii) a multipole rod set ion guide; (iii) an axially segmented multipole rod set ion guide; or (iv) a plurality of plate electrodes arranged generally in the plane of ion travel.

According to an embodiment the further ion trap or ion accumulation device preferably further comprises a device arranged and adapted to supply an AC or RF voltage to the electrodes comprising the further ion trap or ion accumulation device. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz;

(iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

According to an embodiment the mass spectrometer preferably further comprises one or more ion sources preferably selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) a sub-atmospheric pressure Electrospray ionisation ion source; and (xxii) a Direct Analysis in Real Time ("DART") ion source.

The mass spectrometer may further comprise one or more continuous or pulsed ion sources.

The mass spectrometer may further comprise one or more ion guides.

According to an embodiment the mass spectrometer may further comprise one or more ion mobility separation devices and/or one or more Field Asymmetric Ion Mobility Spectrometer devices.

The mass spectrometer may further comprise one or more ion traps or one or more ion trapping regions.

According to an embodiment the mass spectrometer may further comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The collision, fragmentation or reaction cell may be arranged upstream and/or downstream of the further ion trap or ion accumulation device and/or the attenuation device.

According to an embodiment the mass spectrometer may comprise a further mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or Orbitrap® mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

According to an embodiment the mass spectrometer may further comprise one or more energy analysers or electrostatic energy analysers.

According to an embodiment the mass spectrometer may further comprise one or more ion detectors.

According to an embodiment the mass spectrometer may further comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wein filter.

According to an embodiment the mass spectrometer may further comprise a device or ion gate for pulsing ions towards the attenuation device and/or towards the ion trap, ion trap mass analyser or other mass analyser.

According to an embodiment the mass spectrometer may further comprise a device for converting a substantially continuous ion beam into a pulsed ion beam.

According to an embodiment the mass spectrometer may further comprise a C-trap and a mass analyser comprising an outer barrel-like electrode and a coaxial inner spindle-like electrode. In a first mode of operation ions may be transmitted to the C-trap and may then be injected into the mass analyser. In a second mode of operation ions may be transmitted to the C-trap and may then be transmitted to a collision cell or Electron Transfer Dissociation device wherein at least some ions are fragmented into fragment ions, and wherein the fragment ions are then preferably transmitted to the C-trap before being injected into the mass analyser.

According to an embodiment the mass spectrometer may comprise a stacked ring ion guide comprising a plurality of electrodes each having an aperture through which ions are transmitted in use. The spacing of the electrodes may be arranged so as to increase and/or decrease along the length of the ion path. The apertures in the electrodes in an upstream section of the ion guide may have a first diameter and the apertures in the electrodes in a downstream section of the ion guide may be arranged to have a second diameter which is preferably smaller than the first diameter. Opposite phases of an AC or RF voltage are preferably applied, in use, to successive electrodes.

Various embodiments of the present invention will now be described, by way of example only, together with other arrangements given for illustrative purposes only and with reference to the accompanying drawings in which:

FIG. 1 illustrates a method of operating a mass spectrometer according to an embodiment of the present invention;

FIG. 2A shows an ion beam attenuation device according to an embodiment of the present invention wherein an ion beam is transmitted in a high transmission mode of operation, FIG. 2B shows an ion beam attenuation device according to an embodiment of the present invention wherein the ion beam is expanded onto a final electrode when operated in a low transmission mode of operation and FIG. 2C shows an ion beam attenuation device according to an embodiment of the present invention wherein an ion beam is deflected onto an aperture in a final electrode when operated in a low transmission mode of operation;

FIG. 3A shows an ion beam attenuation device according to another embodiment wherein an ion beam is transmitted in a high transmission mode of operation, FIG. 3B shows an ion beam attenuation device according to an embodiment wherein the ion beam is reflected back onto an electrode when operated in a low transmission mode of operation and FIG. 3C shows an ion beam attenuation device according to an embodiment wherein the ion beam is deflected onto an electrode when operated in a low transmission mode of operation;

Figure 6A:
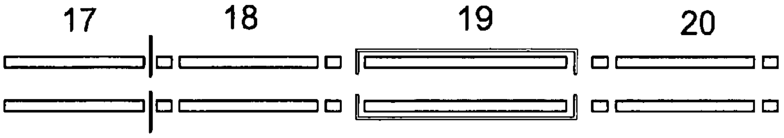
Figure 6B:
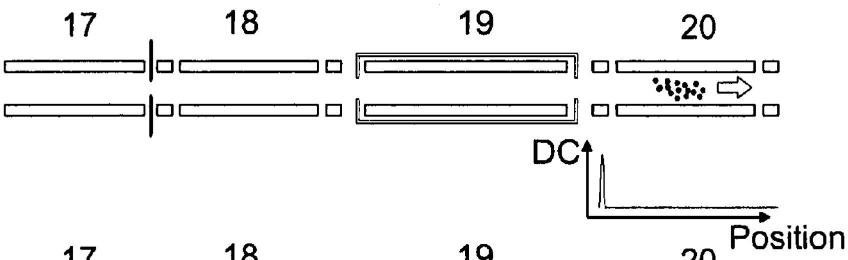
Figure 6C:
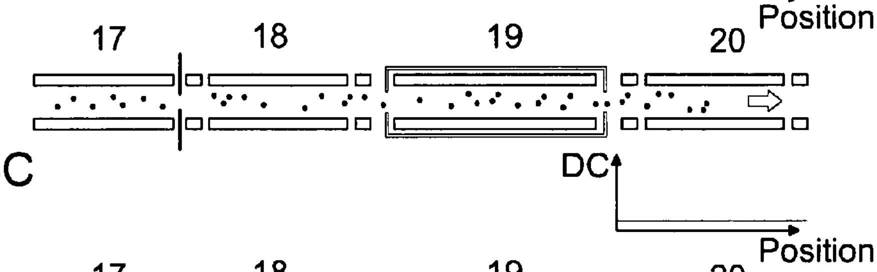
Figure 6D:
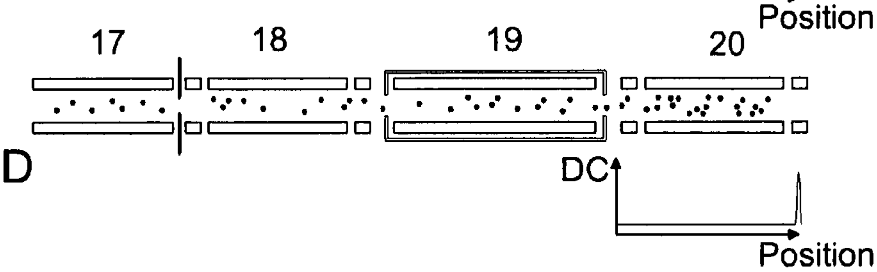
Figure 6E:
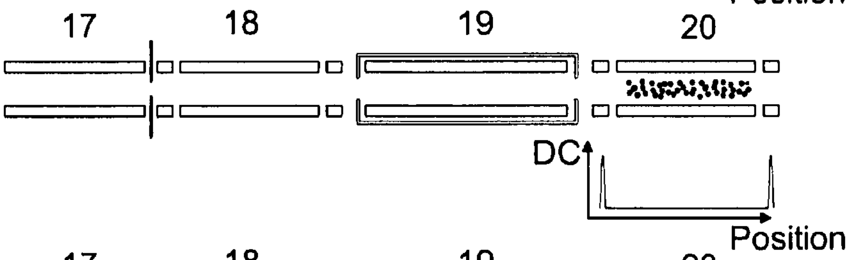
Figure 6F:
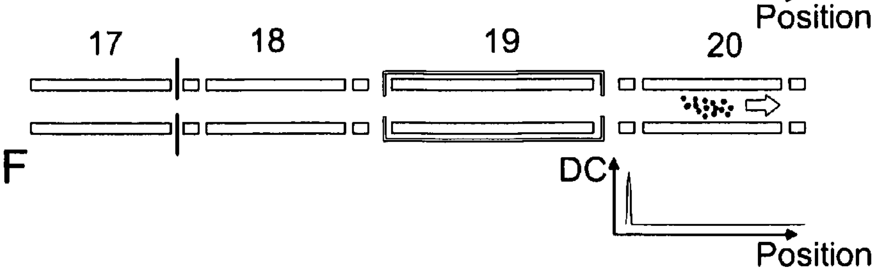
Figure 7A:
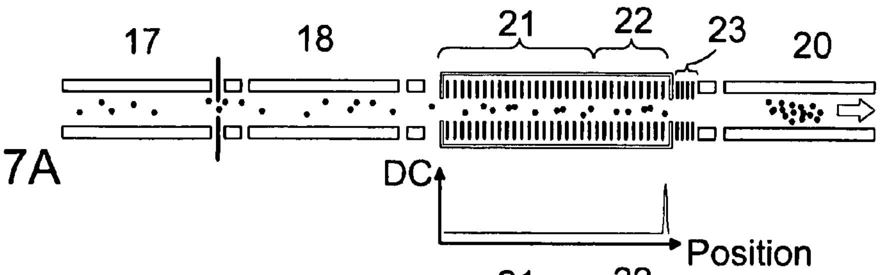
Figure 7B:
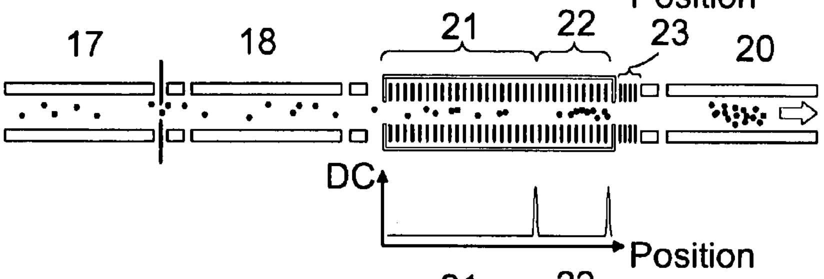
Figure 7C:
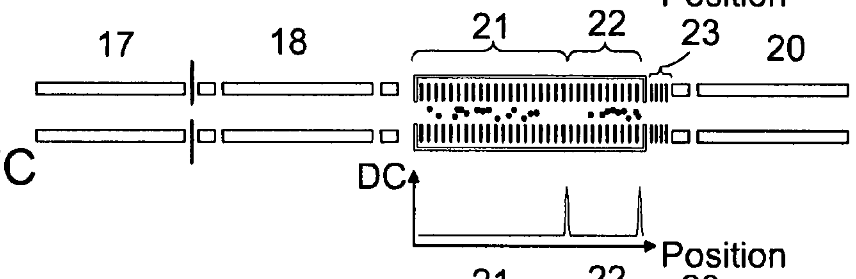
Figure 7D:
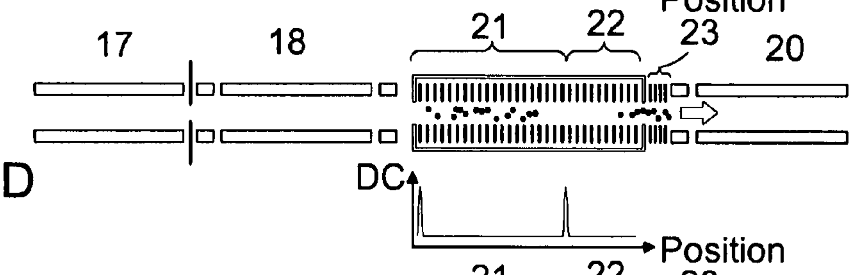
Figure 7E:
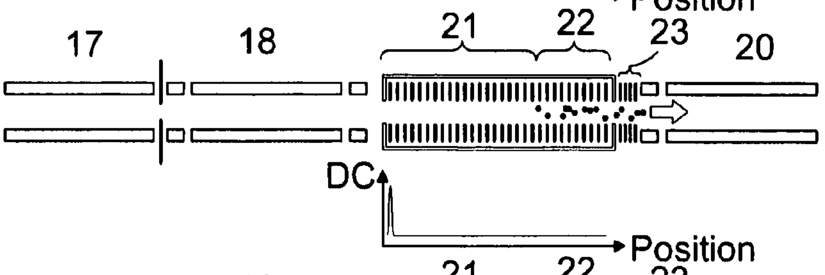
Figure 7F:
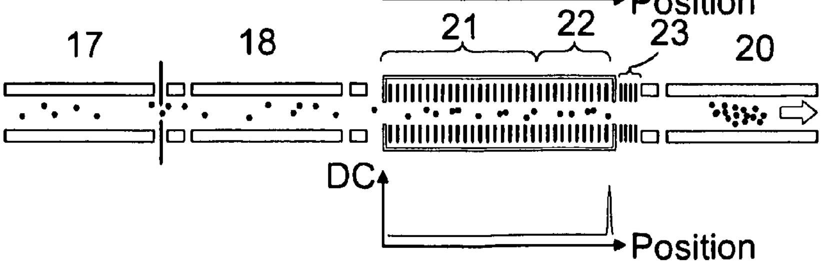
Figure 8A:
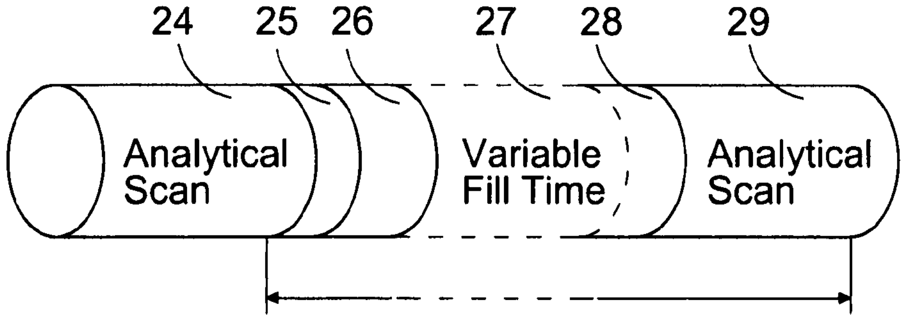
Fig. 8A Prior Art
Figure 8B:
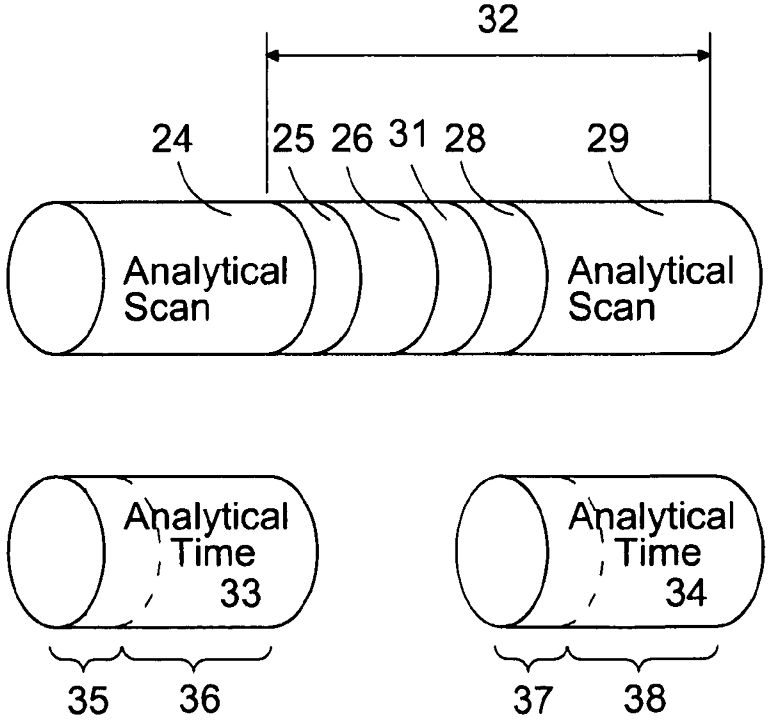

FIG. 6A shows a conventional mass spectrometer comprising an ion guide, a quadrupole mass filter, a collision cell and a quadrupole ion trap mass analyser, FIG. 6B shows ions being mass analysed by the quadrupole ion trap mass analyser, FIG. 6C shows the mass spectrometer being operated in a pre-scan mode of operation, FIG. 6D shows ions being accumulated in the quadrupole ion trap mass analyser for a period of time, FIG. 6E shows ions trapped within the quadrupole ion trap mass analyser and being allowed to cool thermally within the ion trap mass analyser prior to being subjected to mass analysis and FIG. 6F shows ions in the quadrupole ion trap mass analyser being subjected to a second analytical scan;

FIG. 7A shows a mass spectrometer according to a preferred embodiment comprising an ion guide, a quadrupole mass filter, an ion tunnel ion trap which is sub-divided into an upstream trapping region and a downstream trapping region, an ion beam attenuator and a quadrupole ion trap mass analyser, FIG. 7B shows ions being trapped within the downstream trapping region of the ion tunnel ion trap whilst the quadrupole ion trap mass analyser is performing an analytical scan, FIG. 7C shows the mass spectrometer after the quadrupole ion trap mass analyser has completed an analytical scan, FIG. 7D shows ions being released from the downstream trapping region of the ion tunnel ion trap and being transmitted via the ion beam attenuator to the quadrupole ion trap mass analyser, FIG. 7E shows ions being released from the upstream trapping region of the ion tunnel ion trap and passing towards the exit of the ion tunnel ion trap and FIG. 7E shows ions being accumulated in the ion tunnel ion trap of at the start of another cycle; and FIG. 8A illustrates the cycle time for an experiment performed using a conventional mass spectrometer as described above in relation to FIGS. 6A-6F and which includes a relatively long variable fill time and FIG. 8B shows a corresponding cycle time for an experiment performed using a mass spectrometer according to a preferred embodiment of the present invention as described above in relation to FIGS. 7A-7F and which includes a shorter-fixed fill time.

In the following description, the generic term "ion trap" is used and this term is intended to include, but is not limited to, ion traps such as 3D or Paul ion traps, 2D or linear ion traps, Orbitrap® instruments and FTICR instruments.

Figure 1:
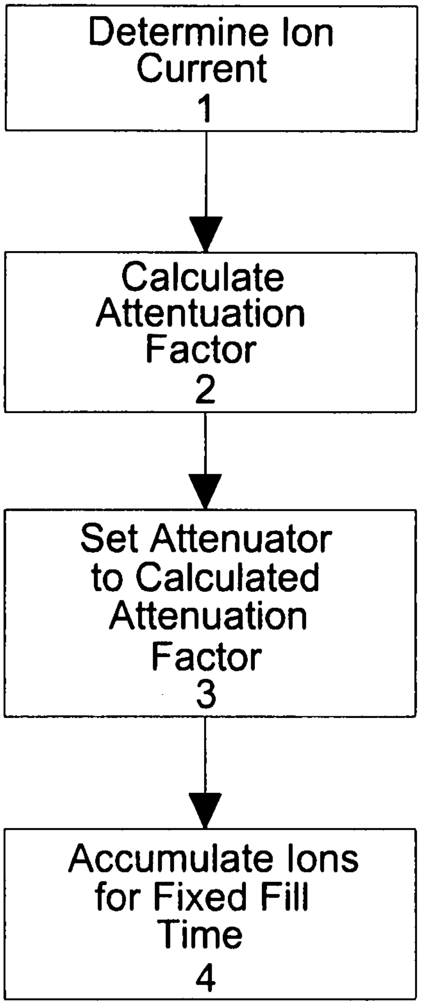

A first preferred embodiment of the present invention will now be described in more detail with reference to FIG. 1. According to the preferred embodiment the ion current within a region or section of a mass spectrometer is preferably determined as a first step 1. The ion current may be determined by several methods. For example, according to one embodiment the ion beam may be mass analysed using a mass analyser such as a quadrupole mass filter ("QMF"), a Time of Flight ("TOF") mass analyser, an orthogonal acceleration Time of Flight ("oa-TOF") mass analyser, a 3D or Paul ion trap, a 2D or linear ion trap, an Orbitrap® mass analyser or an FTICR mass analyser. According to another embodiment the total ion current may be measured directly using a charge detector such as a Faraday Cup detector, a microchannel plate ("MCP") detector, an electron multiplier detector, a gas electron multiplier ("GEM") or a charge induction detector. According to another embodiment the ion current may be measured indirectly by non-destructive means such as via charge induction or image current detection. According to another embodiment prior knowledge of the incoming ion current may be determined by external means, for example using a UV detector in combination with an HPLC or HPLC system e.g. to measure the absorption profile of one or more eluents. According to a yet further embodiment a previously acquired mass spectrum or ion current measurement may be used.

The first step 1 of determining the ion current may or may not include an accumulation period during which time ions are accumulated in an ion trap prior to being measured. The first step 1 of determining the ion current may optionally include a fragmentation step wherein ions are fragmented prior to the ion current being measured. The first step 1 of determining the ion current may include an isolation/filtration step wherein all ions except those ions having a selected mass to charge ratio or multiple mass to charge ratios are removed from the ion beam prior to the ion current measurement.

In a second step 2 an attenuation factor is preferably calculated or determined using the following relation:

$$\text{Attenuation Factor} = \frac{\text{Desired Number of Ions}}{\text{Measured Ion Current} * \text{Fixed Fill Time}} \quad (1)$$

In a third step 3 the attenuation factor is preferably applied to an attenuation device or is otherwise used to control an attenuation device. The attenuation device preferably comprises an electrostatic device comprising at least one electrode. The attenuation device may be used to alter, deflect, focus, defocus, attenuate or substantially block an ion beam.

In a fourth step 4 ions are preferably accumulated within an ion trap or ion trap mass analyser for a fixed period of time which preferably remains the same irrespective of the measured ion current. The ion trap or ion trap mass analyser is preferably located downstream of the attenuation device. The ion trap or ion trap mass analyser preferably receives an ion beam which has been attenuated by the attenuation device by the determined attenuation factor. According to an alternative embodiment the attenuation device and an accumulation device may be combined into a single device or single ion-optical component.

According to the preferred embodiment ions which have been accumulated within the ion trap or ion trap mass analyser may then subsequently be mass analysed by operating the ion trap as a mass analyser. Alternatively, ions may be transferred from the ion trap to another device for subsequent mass analysis.

Figure 2A:
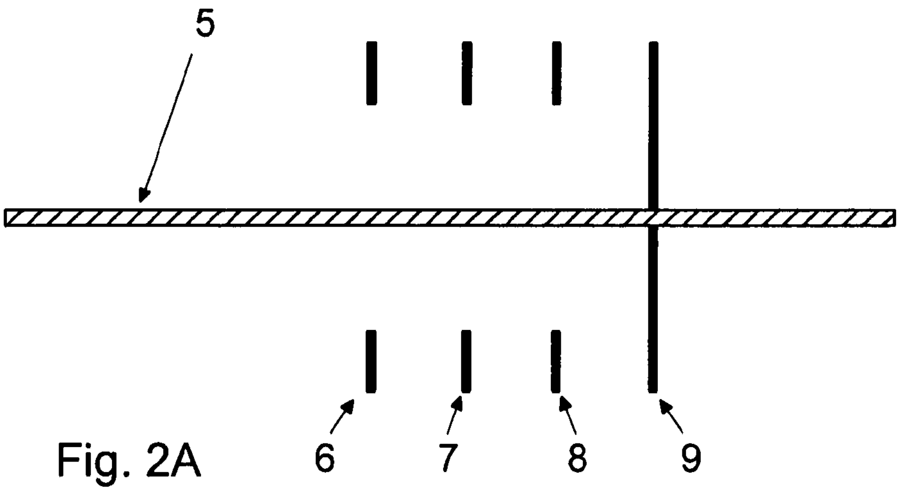
Figure 2B:
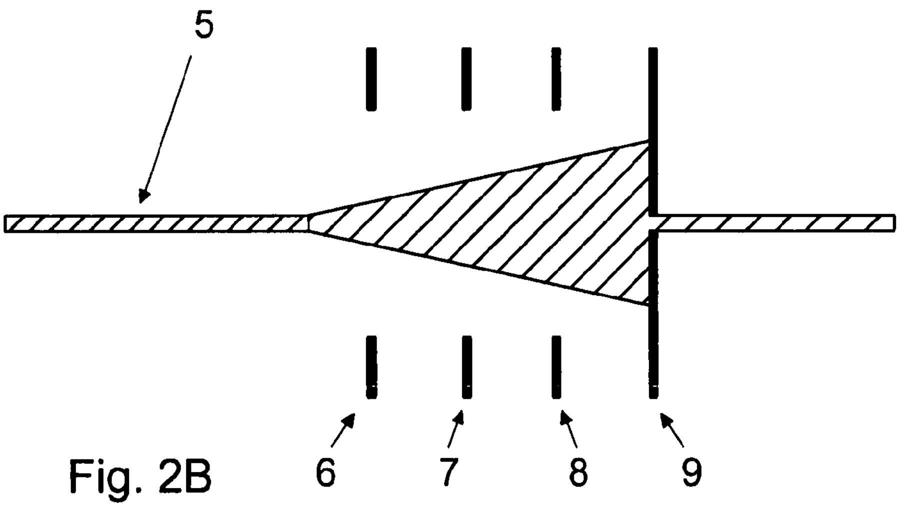
Figure 2C:
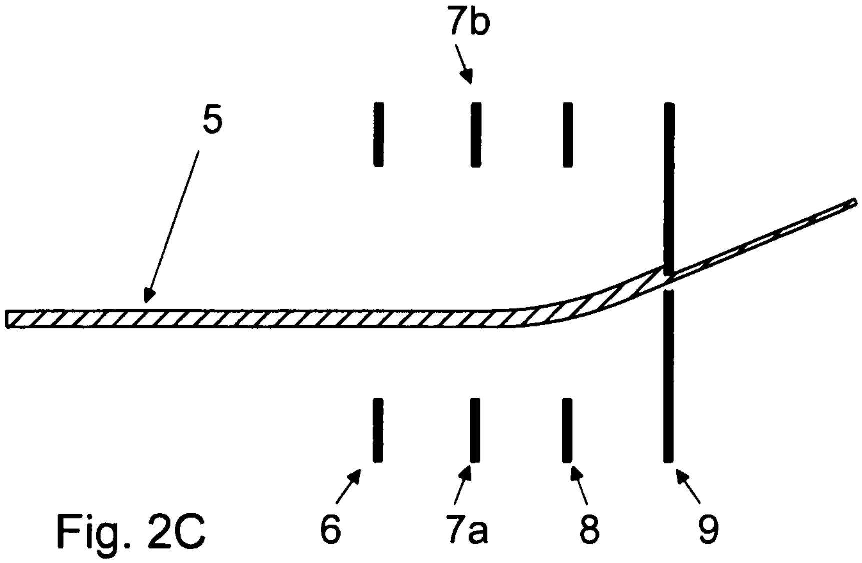

FIGS. 2A-2C show examples of an ion beam attenuation device which may be used to attenuate the ion beam according to an embodiment of the present invention. FIG. 2A shows an embodiment wherein an ion beam 5 is arranged to pass through an electrostatic lens comprising three electrodes 6,7,8 together with an exit plate 9 which has an aperture. As shown in FIG. 2B, the profile of the ion beam may be expanded by the electrostatic lenses 6,7,8 in order to reduce the intensity of the beam transmitted by the exit plate 9. Alternatively, as shown in FIG. 2C, the ion beam may, for example, be deflected by the electrodes 6,7,8 in a direction away from the initial direction of travel of the ion beam 5 such that only a portion of the ion beam 5 is onwardly transmitted through the aperture in the exit plate 9.

Figure 3A:
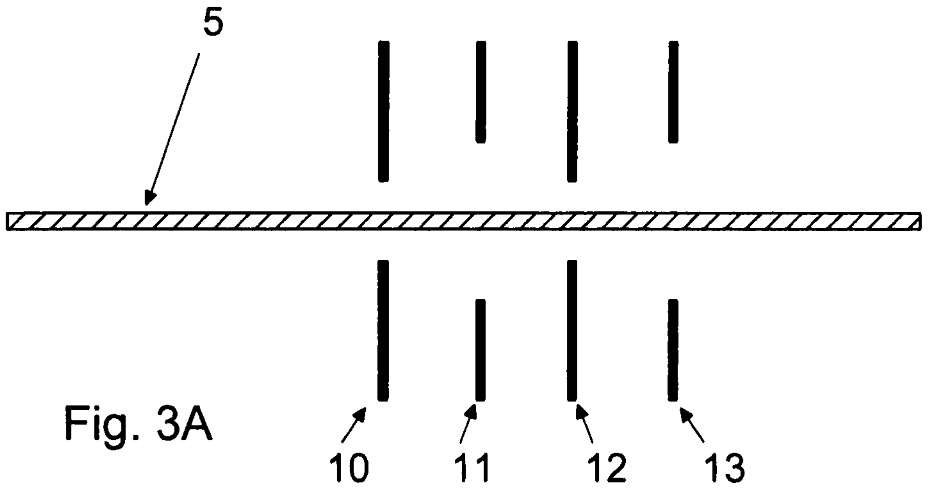
Figure 3B:
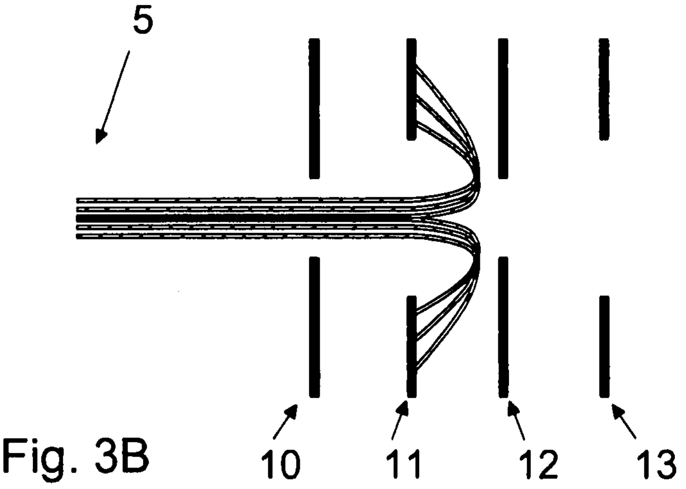
Figure 3C:
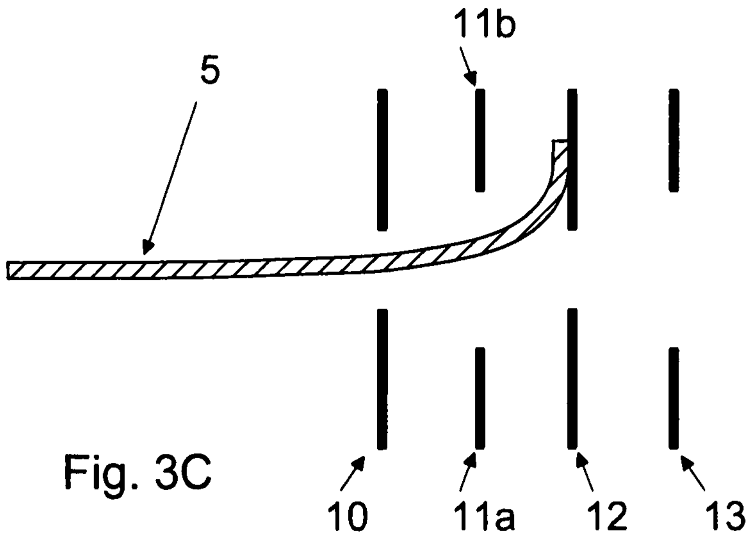

FIGS. 3A-C show an ion beam attenuation device which may be used to attenuate the ion beam according to another embodiment of the present invention. FIG. 3A shows an embodiment wherein in a high transmission mode of operation an ion beam 5 passes through three pairs of electrodes 10,11,12 prior to passing through a final electrode 13 comprising an aperture. In the high transmission mode of operation the first pair of electrodes 10, the second pair of electrodes 11 and the third pair of electrodes 12 are preferably all held at nominally identical voltages such that an essentially or substantially field free region is provided within the electrostatic lens arrangement 10,11,12 formed by the three pairs of electrodes 10,11,12. The ion beam 5 is preferably transmitted through the final electrode 13 without substantially being attenuated. The ion beam which emerges from the attenuation device, has therefore, preferably substantially the same intensity as the ion beam which was initially received by the electrostatic lens arrangement 10,11,12.

FIGS. 3B and 3C show the same electrostatic lens arrangement 10,11,12 when operated in a low transmission mode of operation wherein voltages are applied to the pairs of electrodes 10,11,12 such that the ion beam 5 is either substantially reflected as is shown in FIG. 3B or alternatively is deflected as shown in FIG. 3C. The ion beam 5 is preferably not transmitted through the final electrode 13. Alternatively, the ion beam 5 may be transmitted by the final electrode 13 but the intensity of the ion beam 5 may be substantially reduced in intensity.

Figure 4:
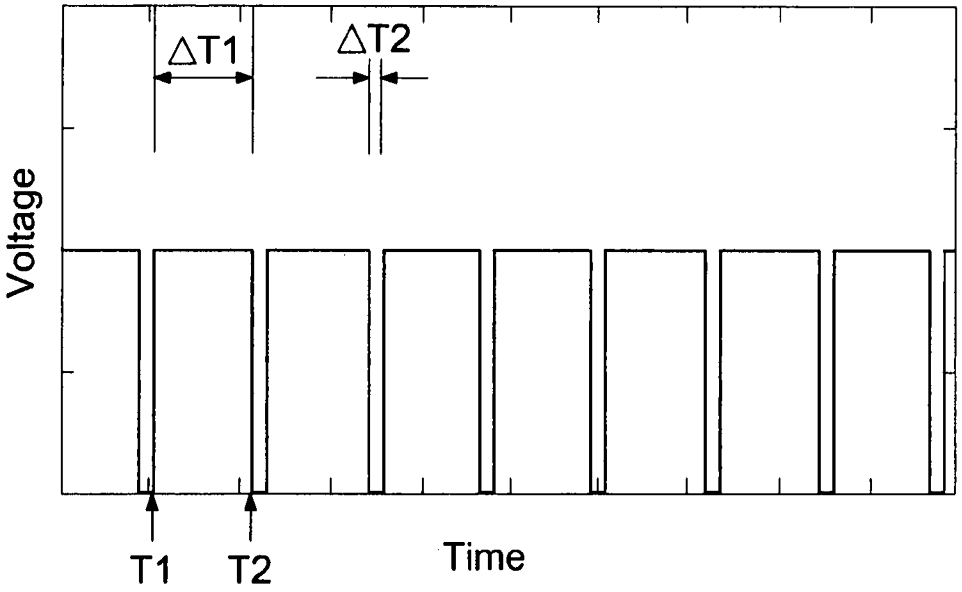
FIG. 4 shows a voltage timing diagram for an attenuation device as shown in FIGS. 3A-3C in accordance with an embodiment of the present invention.

FIG. 4 shows a voltage timing diagram for the embodiment shown and described above with reference to FIGS. 3A-3C wherein a gate or retarding voltage is applied to some or all of the pairs of electrodes 10,11,12. The gate or retarding voltage may be considered as being switched ON starting at a time T1 and lasting for or otherwise being applied to the electrodes 10,11,12 for a time period ΔT1. During the time period ΔT1 the transmission of the ion beam 5 through the final electrode 13 is preferably reduced to substantially zero. At the end of the time period ΔT1 the gate or retarding voltage applied to the electrodes 10,11,12 is then preferably switched OFF. The gate or retarding voltage then preferably remains OFF for a subsequent time period ΔT2. During the time period ΔT2 the transmission of the ion beam 5 through the final electrode 13 preferably remains high and is preferably substantially 100%.

The ion beam attenuator, may, therefore, effectively operate as a pulsed transmission device having a mark space ratio given by ΔT2/ΔT1. The average transmission of the ion beam is likewise proportional to the duty cycle of the device which is given by ΔT2/(ΔT1+ΔT2). In the particular voltage timing diagram shown in FIG. 4, the mark space ratio is 1:9 and hence the duty cycle is 0.1. Therefore, the ion beam will be attenuated by 90% i.e. the ion beam exiting the ion beam attenuator will be 10% of the intensity of the ion beam which was received by or which was otherwise initially incident upon the ion beam attenuator.

Figure 5:
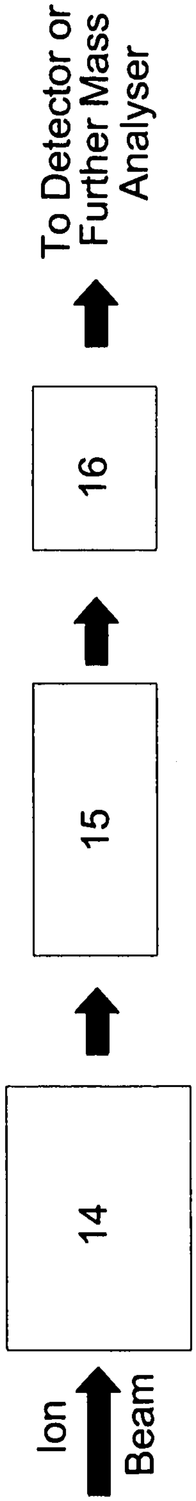
FIG. 5 illustrates an embodiment of the present invention wherein a mass spectrometer is provided comprising an ion trap, an ion beam attenuator and an ion trap mass analyser arranged downstream of the ion trap and the ion beam attenuator.

FIG. 5 shows an embodiment wherein an ion accumulation device or ion trap 14 is positioned upstream of an ion beam attenuator 15. An analytical ion trap 16 (e.g. an ion trap mass analyser) is positioned downstream of the ion beam attenuator 15. The benefit of this arrangement can be understood by comparing an experiment performed using a conventional arrangement with an experiment performed according to the preferred embodiment comprising in general terms an ion accumulation device 14, an ion beam attenuator 15 and an ion trap or ion trap mass analyser 16 arranged as shown in FIG. 5.

FIG. 6A shows a conventional triple quadrupole mass spectrometer comprising a quadrupole rod set ion guide 17, a first quadrupole rod set mass filter 18, a collision cell 19 and a second quadrupole rod set 20. The second quadrupole rod set 20 may be operated in a mode of operation as a linear ion trap. FIGS. 6B to 6F follow the course of an experiment which may be performed using the conventional device. As shown in FIG. 6B, an analytical scan may be performed using the second quadrupole rod set mass filter 20 which is operated as a linear ion trap 20 in this mode of operation. During the analytical scan, any ions which are being received by the mass spectrometer are not accumulated and are lost. Once the analytical scan is complete, a pre-scan may then be performed as shown in FIG. 6C to determine the incoming ion current. After the prescan has been performed, an appropriate (variable) fill time may then be calculated. The fill time corresponds with the period of time during which ions are allowed to accumulate in the linear ion trap or second quadrupole rod set 20. FIG. 6D shows ions being accumulated in the second quadrupole 20 which is operated as an ion trap 20. After accumulation within the ion trap 20 the ions are then allowed to cool within the ion trap 20 for a period of time as shown in FIG. 6E. Finally, a second analytical scan of the ions in the second quadrupole 20 is then performed as shown in FIG. 6F.

FIG. 7A shows a mass spectrometer according to an embodiment of the present invention. The mass spectrometer preferably comprises an ion guide 17 and a first mass filter 18. A gas collision cell 21,22 is provided downstream of the first mass filter 18 and preferably comprises a stacked ring ion guide (SRIG) that may be used as an ion trap or or ion accumulation device in a mode of operation. An ion beam attenuator 23 is preferably arranged downstream of the gas collision cell 21,22. A linear ion trap 20 is preferably arranged downstream of the ion beam attenuator 23. FIGS. 7A-7F show the steps of an comparable experiment to that described above in relation to FIGS. 6A-6F and which may be performed in accordance with an embodiment of the present invention.

The stacked ring ion guide 21,22 is preferably constructed from a series of ring plates or electrodes each having an aperture through which ions may be transmitted in use. Opposite phases of an RF voltage are preferably applied to adjacent electrodes in order to generate a radial pseudo-potential well which acts to confine ions radially within the device. One or more transient DC pulses or voltages are preferably applied to the electrodes of the stacked ring ion guide 21,22 in a manner such that a travelling wave or train of DC voltage pulses are preferably translated along the ion guide 21,22 in order to transport ions from one part of the ion guide 21,22 to another. Trapping potentials may also be applied to individual electrodes of the ion guide 21,22. In this way the stacked ring ion guide 21,22 may effectively be split into two distinct ion accumulation regions 21,22. A downstream ion accumulation region 22 may be used to accumulate ions for use in a prescan mode of operation and an upstream ion accumulation region 21 may be used to accumulate ions for use in an analytical scan. The two ion accumulation regions 21,22 may be pressurised by admitting gas from the ion source and/or via the ion inlet of the mass spectrometer. Alternatively, the two ion accumulation regions 21,22 may be pressurised using a secondary gas source. According to another embodiment, the two ion accumulation regions 21,22 may be evacuated to low vacuum.

FIG. 7A shows the mass spectrometer being operated in a mode of operation wherein an analytical scan is performed by the linear ion trap 20 which is arranged downstream of the ion beam attenuator 23. Whilst the analytical scan is being performed, incoming ions are advantageously accumulated in the ion guide 21,22 by applying a DC voltage to an electrode arranged at the exit of the downstream ion accumulation region 22.

For a defined period of time, one or more travelling waves or one or more transient DC voltages may be applied to the electrodes of the gas collision cell or ion guide 21,22 in order to move incoming ions to the end of the gas collision cell or ion guide 21,22. The ions are preferably confined and prevented from exiting the ion guide 21,22 by the application of the DC trapping potential to the electrode at the exit of the downstream ion accumulation region 22.

After a defined period of time an additional DC barrier is preferably raised or otherwise created between the first upstream ion accumulation region 21 and the second downstream ion accumulation region 22 of the gas collision cell or ion guide 21,22 as shown in FIG. 7B. As a result, ions within the ion guide 21,22 are accumulated within the second downstream ion accumulation region 22. For the remainder of the time that the linear ion trap 20 is performing its analytical scan, incoming ions are accumulated in the first upstream accumulation region 21.

At the end of the analytical scan a prescan may be performed using ions accumulated in the second downstream ion accumulation region 22 in a manner as shown in FIG. 7D. During the prescan mode of operation the ion beam attenuator 23 arranged downstream of the ion guide 21,22 is preferably set or is otherwise arranged to pass substantially 100% of the prescan ions which are released from the second downstream ion accumulation region 22.

Once the prescan has been completed, then an attenuation factor is preferably calculated or determined. The attenuation factor is then preferably applied to the ion beam attenuator 23 and ions accumulated in the first upstream accumulation region are preferably released by removing the DC barrier between the upstream ion accumulation region 21 and the downstream ion accumulation region 22. As a result, the ion beam attenuator 23 will preferably attenuate the ions which have been accumulated in the first accumulation region 21 by the attenuation factor as they are being transferred from the gas collision cell or ion guide 21,22 to the linear ion trap 20 as shown in FIG. 7E.

After the ions have been transferred into the downstream linear ion trap 20 then the ions are preferably allowed to cool or thermalise. Once the ions have been allowed to cool or thermalise, an analytical scan is then preferably performed as shown in FIG. 7F. Whilst this analytical scan is being performed, ions are meanwhile allowed to accumulate in the gas collision cell or ion guide 21,22 and ions are preferably prevented from exiting the ion guide 21,22 by the application of a DC trapping potential to an electrode arranged at the exit of the gas collision cell or ion guide 21,22.

In this experiment, the potentially long period of time required to accumulate ions for an analytical scan is performed in parallel with a preceding analytical scan, thus significantly reducing the overall cycle time of the experiment. To highlight this, FIG. 8A shows the cycle time 30 when using an conventional arrangement as shown and described above with reference to FIGS. 6A-6F and which includes a relatively long variable fill time. FIG. 8B shows a corresponding reduced cycle time 32 when using a mass spectrometer arranged according to an embodiment of the present invention substantially as shown and described above with reference to FIGS. 7A-7F and which includes a much shorter fixed fill time.

For sake of illustration only, it may be assumed that when a conventional experiment is performed then the cycle time is the sum of an interscan time 25 of 5 ms, a prescan time 26 of 10 ms, a variable fill time 27 of 200 ms, a cooling time 28 of 10 ms and an analytical scan time 29 of 200 ms and hence the conventional cycle time 30 is approximately 425 ms. However, according to the preferred embodiment the cycle time is significantly reduced since the conventional variable fill time 27 of 200 ms is replaced by a much shorter ion transfer time 31 of 5 ms. As a result, the cycle time according to the preferred embodiment is only 230 ms which is significantly reduced compared with a conventional cycle time. It is apparent, therefore, that the present invention is particularly advantageous. The preferred embodiment is particularly advantageous in that a greater number, of scans can be acquired per second with an improved sampling efficiency.

Although the present invention has been described with reference to preferred embodiments, it will be understood by those skilled in the art that various modifications may be made to the particular embodiments discussed above without departing from the scope of the invention as set forth in the accompanying claims.

The invention claimed is:

1. A method of mass spectrometry comprising:

providing an attenuation device and an ion trap arranged downstream of said attenuation device;

determining a first ion current $I_1$;

controlling said attenuation device based upon said determined first ion current $I_1$ so as to set the intensity of ions transmitted by said attenuation device and passed to said ion trap at a first level; and allowing ions to accumulate within said ion trap for a first fixed period of time $T_1$ which is substantially independent of said determined first ion current $I_1$.

2. A method as claimed in claim 1, wherein said ion trap comprises an ion trap mass analyser and wherein an ion detector is arranged to detect ions which are ejected or which otherwise emerge from said ion trap.

3. A method as claimed in claim 1, further comprising ejecting ions from said ion trap or allowing ions to emerge from said ion trap, wherein said ions are then transmitted to a mass analyser arranged downstream of said ion trap.

4. A method as claimed in claim 1, wherein said step of determining said first ion current $I_1$ comprises using a first device to determine said first ion current $I_1$, wherein said first device is selected from the group consisting of: (i) a mass analyser; (ii) a charge detector; (iii) a charge induction device; (iv) an image current detector; and (v) an ultra-violet ("UV") detector in combination with a liquid chromatography system which is arranged and adapted to determine an absorption profile of one or more eluents.

5. A method as claimed claim 1, wherein said step of determining said first ion current $I_1$ comprises either: (i) using previously acquired data or mass spectral data; or (ii) estimating said ion current based upon previously acquired data or mass spectral data.

6. A method as claimed in claim 1, further comprising calculating an attenuation factor based upon said determined first ion current $I_1$, and wherein said step of controlling said attenuation device comprises setting said attenuation device to attenuate an ion beam which is onwardly transmitted by said attenuation device by said attenuation factor.

7. A method as claimed in claim 1, wherein said attenuation device comprises either: (i) an electrostatic lens which is arranged and adapted to alter, deflect, focus, defocus, attenuate, block, expand, contract, divert or reflect an ion beam; or (ii) one or more electrodes, rod sets or ion-optical devices which are arranged and adapted to alter, deflect, focus, defocus, attenuate, block, expand, contract, divert or reflect an ion beam.

8. A method as claimed in claim 1, wherein said step of controlling said attenuation device comprises repeatedly switching said attenuation device between a low transmission mode of operation and a high transmission mode of operation, wherein said attenuation device is maintained in said low transmission mode of operation for a time period $\Delta T\mathbf{1}$ and said attenuation device is maintained in said high transmission mode of operation for a time period $\Delta T2$ and wherein the duty cycle of said attenuation device is given by $\Delta T2/(\Delta T1+\Delta T\mathbf{2})$.

9. A method as claimed in claim 1, further comprising:

determining a second ion current $I_2$;

controlling said attenuation device based upon said determined second ion current $I_2$ so as to set the intensity of ions transmitted by said attenuation device and passed to said ion trap at a second different level; and allowing ions to accumulate within said ion trap for a second fixed period of time $T_2$ which is substantially independent of said determined second ion current $I_2$, and wherein either $T_1$ equals or substantially equals $T_2$.

10. A method as claimed in claim 9, further comprising:

determining a third ion current $I_3$;

controlling said attenuation device based upon said determined third ion current $I_3$ so as to set the intensity of ions transmitted by said attenuation device and passed to said ion trap at a third different level; and allowing ions to accumulate within said ion trap for a third fixed period of time $T_3$ which is substantially independent of said determined third ion current $I_3$, and wherein $T_1$ equals or substantially equals $T_2$, and wherein $T_2$ equals or substantially equals $T_3$.

11. A method as claimed in claim 10, further comprising:

determining a fourth ion current $I_4$;

controlling said attenuation device based upon said determined fourth ion current $I_3$ so as to set the intensity of ions transmitted by said attenuation device and passed to said ion trap at a fourth different level; and allowing ions to accumulate within said ion trap for a fourth fixed period of time $T_4$ which is substantially independent of said determined fourth ion current $I_4$, and wherein $T_1$ equals or substantially equals $T_2$, $T_2$ equals or substantially equals $T_3$, and wherein $T_3$ equals or substantially equals $T_4$.

12. A method as claimed in claim 1, further comprising arranging an ion accumulation device or ion trap either upstream or downstream of said attenuation device.

13. A method as claimed in claim 12, wherein said ion accumulation device or ion trap comprises a first upstream ion accumulation region and a second downstream ion accumulation region and wherein in a mode of operation: (i) a DC or RF potential barrier is applied to an electrode arranged at the entrance to said first upstream ion accumulation region in order to prevent further ions from entering said ion accumulation device or ion trap; or (ii) a DC or RF potential barrier is applied to an electrode arranged between said first upstream ion accumulation region and said second downstream ion accumulation region in order to prevent ions from passing from said first upstream ion accumulation region to said second downstream ion accumulation region; or (iii) a DC or RF potential barrier is applied to an electrode at the exit to said second downstream ion accumulation region in order to prevent ions from exiting said ion accumulation device or ion trap.

14. A method as claimed in claim 12, wherein once ions have been accumulated in said ion accumulation device or ion trap then said ion accumulation device or ion trap is operated so as to mass selectively or mass to charge ratio selectively remove or attenuate at least some ions having an undesired mass or mass to charge ratio.

15. A method as claimed in claim 12, wherein ions are ejected or are onwardly transmitted from said ion accumulation device or ion trap in a mass selective or mass to charge ratio selective manner.

16. A mass spectrometer comprising:

an attenuation device;

an ion trap arranged downstream of said attenuation device; and a control system arranged and adapted:

(i) to determine a first ion current $I_1$;

(ii) to control said attenuation device based upon said determined first ion current $I_1$ so as to set the intensity of ions transmitted by said attenuation device and passed to said ion trap at a first level; and (iii) to allow ions to accumulate within said ion trap for a first fixed period of time $T_1$ which is substantially independent of said determined first ion current $I_1$.

17. A mass spectrometer as claimed in claim 16, wherein, in use, said attenuation device is repeatedly switched between a low transmission mode of operation and a high transmission mode of operation, wherein said attenuation device is maintained in said low transmission mode of operation for a time period $\Delta T\mathbf{1}$ and said attenuation device is maintained in said high transmission mode of operation for a time period $\Delta T\mathbf{2}$ and wherein the duty cycle of said attenuation device is given by $\Delta T\mathbf{2}/(\Delta T\mathbf{1}+\Delta T\mathbf{2})$.

18. A mass spectrometer as claimed claim 16, further comprising an ion accumulation device or ion trap arranged either upstream or downstream of said attenuation device.

* * * * *